No. 790,307. PATENTED MAY 23, 1905.
J. H. McCAULEY & E. M. WINFREY.
MACHINE FOR CLEANING VEGETABLE FIBER.
APPLICATION FILED MAR. 24, 1904.

2 SHEETS—SHEET 2.

Witnesses
Jas A. Keith
[signature]

Inventors
J. H. McCauley.
and
E. M. Winfrey
By H. R. Wilson
Attorney

No. 790,307.

Patented May 23, 1905.

UNITED STATES PATENT OFFICE.

JOHN H. McCAULEY AND EDGAR M. WINFREY, OF WICHITA FALLS, TEXAS.

MACHINE FOR CLEANING VEGETABLE FIBER.

SPECIFICATION forming part of Letters Patent No. 790,307, dated May 23, 1905.

Application filed March 24, 1904. Serial No. 199,889.

*To all whom it may concern:*

Be it known that we, JOHN H. McCAULEY and EDGAR M. WINFREY, citizens of the United States, residing at Wichita Falls, in the county of Wichita and State of Texas, have invented certain new and useful Improvements in Machines for Cleaning Vegetable Fiber; and we do declare the following to be a full, clear, and exact description of the invention, such as will enable others skilled in the art to which it appertains to make and use the same.

This invention relates to improvements in machines for cleaning vegetable fibers.

The object of the invention is to provide a machine of this character in which the fibers of the leaves and stalks of fiber-producing plants may be combed out and cleaned.

A further object is to provide means for feeding the material to the cleaning mechanism and also means for clearing said cleaning mechanism of particles of pulp and bark that may adhere thereto.

With these and other objects in view the invention consists of certain novel features of construction, combination, and arrangement of parts, as will be more fully described, and particularly pointed out in the appended claims.

Figure 1:
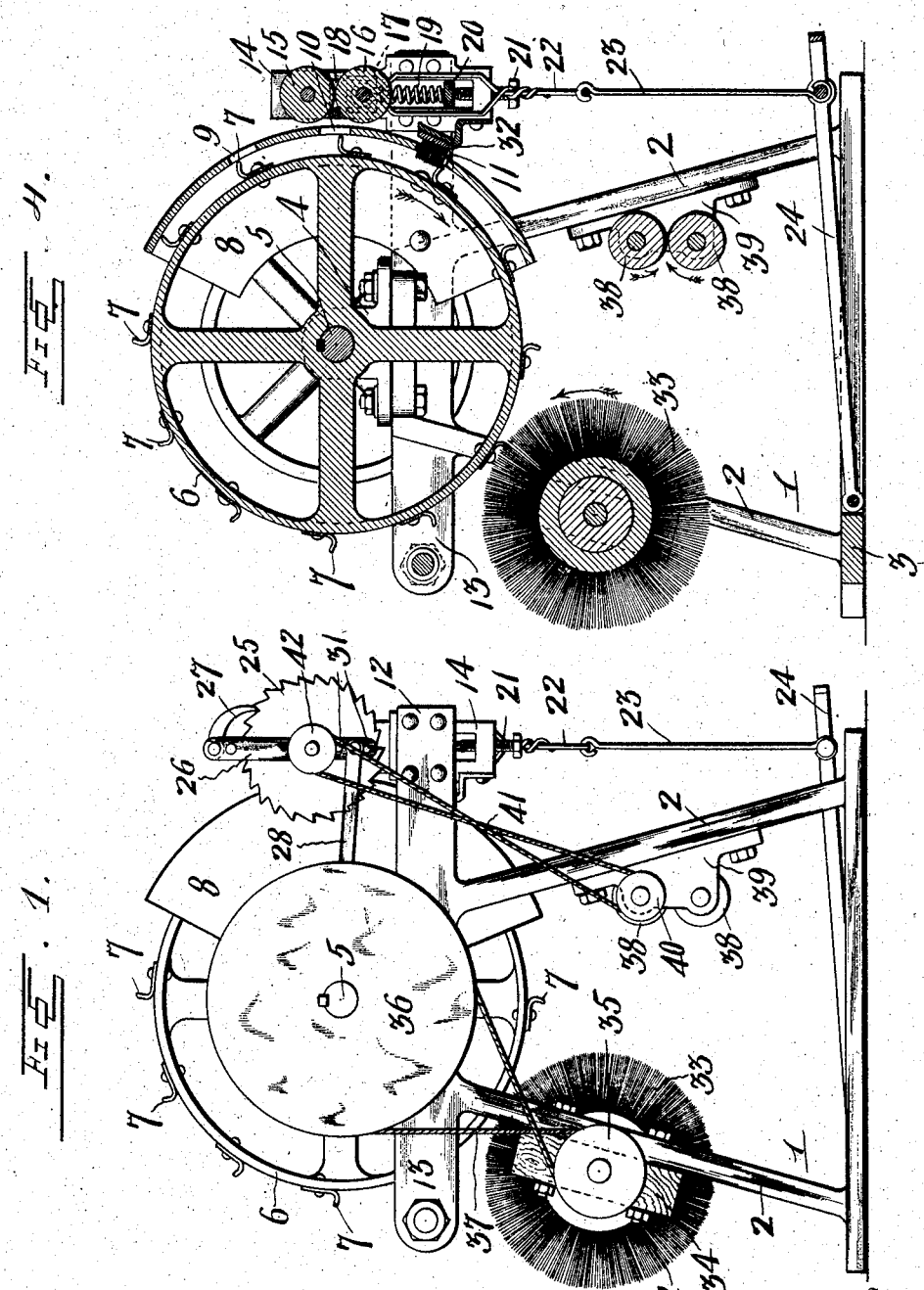
Figures 2, 3:
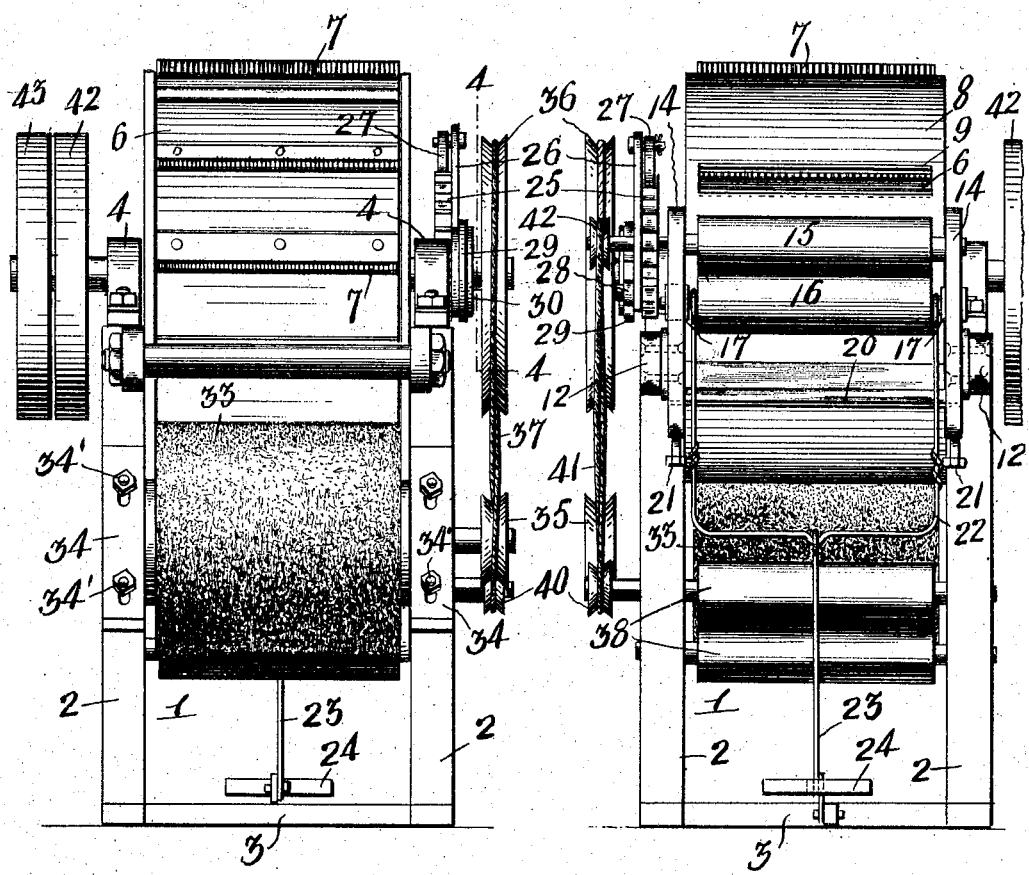
Figure 5:
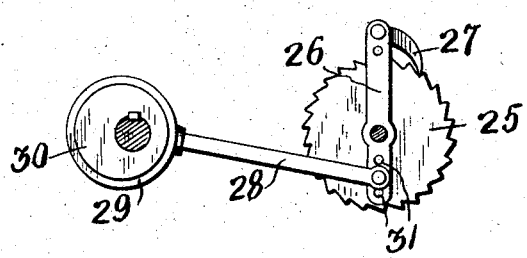

In the accompanying drawings, Figure 1 is a side elevation of the machine. Fig. 2 is an end elevation of one end of the same. Fig. 3 is a similar view of the opposite end. Fig. 4 is a central vertical longitudinal sectional view of the machine. Fig. 5 is a detail vertical longitudinal sectional view on the line 4 4 of Fig. 2, showing the mechanism for actuating the feed-rolls.

Referring more particularly to the drawings, 1 denotes a frame or support for the machine, consisting of a pair of uprights or standards 2, connected together at their lower ends by a cross-bar 3. In the upper end of the same are secured bearing-boxes 4, in which is mounted a shaft 5. On said shaft, between the standards, is fixed a broad-rimmed wheel or drum 6, on the periphery of which is secured a series of transversely-arranged combs 7, which are spaced apart at suitable intervals around the same.

The combs 7 may be secured to the rim of the wheel or drum in any suitable manner, but are preferably bolted to the same, as shown. The teeth of said combs project outwardly and are slightly curved.

On the frame of the machine is secured a segmental shell or casting, forming a concave or shoe 8. Said concave is arranged on the forward side of the frame and in such position that the wheel or drum will turn therein, the combs on said drum just clearing the inner side of the curved wall of the same. In said curved wall are formed three horizontal transversely-disposed slots 9, 10, and 11, the purpose of which will be hereinafter described.

On the upper end of the standards are formed forwardly and rearwardly projecting arms or brackets 12 and 13. To the forward brackets 12 are bolted vertically-disposed bearing-plates 14. Between said plates are arranged a pair of rubber feed-rolls 15 and 16. The shaft of the upper roll 15 is journaled in the upper end of said plates, while the shaft of the lower roll 16 is journaled in boxes 17, which are adjustably mounted in slots 18, formed in the lower portion of the plates. The boxes 17 are normally forced upward to hold the lower roll 16 in engagement with the upper roll 15 by coiled springs 19, which are confined in said slots between the lower end of the boxes and a plate or bar 20. Set-screws 21 are arranged in the lower ends of the plates 14, the upper ends of said screws engaging the under side of said plate or bar 20, whereby when the screws are turned said plate will be raised or lowered to adjust the tension of the springs 19, thereby causing the lower roll 16 to more or less tightly engage the upper roll 15.

In order that the bottom roll 16 may be lowered to form a space to facilitate the admission of the leaves or stalks to be treated, a substantially U-shaped bail 22 is connected at its upper ends with the boxes 17 of the roll 16, and to the lower end of the bail is connected the upper end of a link or bar 23, the lower end of which is pivotally connected to a foot-lever 24, pivotally mounted in the lower end of the frame, as shown.

On one end of the shaft of the upper roll 15 is fixedly mounted a ratchet-wheel 25, and on the outer end of said shaft, adjacent to said wheel, is loosely mounted a lever 26. On the upper end of said lever is pivotally mounted a pawl or dog 27, which is adapted to engage the teeth of said ratchet-wheel. To the lower end of the lever 26 is pivotally connected a pitman-rod 28, the opposite end of which is connected to an eccentric-strap 29, which passes around an eccentric-disk 30, fixed on the shaft 5, so that when said shaft is turned the eccentric will reciprocate said pitman-rod and cause the same to rock the lever 26, thereby engaging the pawl 27 with the teeth on the ratchet-wheel and turning said wheel with an intermittent movement which is imparted to the feed-roll 15, as will be understood.

The lower end of the lever 26 is provided with a series of holes 31, whereby the end of the pitman-rod 28 may be adjustably connected thereto to rock said lever to a greater or less degree, thereby increasing or diminishing the movement of the ratchet-wheel to cause more or less material to be fed into the machine at each turn of the feed-rolls.

In the lower portion of the bearing-plates 14 is mounted a brush 32, the bristles of which are adapted to project through the slot 11 in the concave to hold the fiber close to and in position to be engaged by teeth of the combs as they pass around through the concave.

Below the drum or wheel 6 is arranged a cylindrical brush 33, which is rotatably mounted in boxes 34, adjustably secured to the standards 2 by bolts 34, which pass through said standards and through slots in said blocks and receive clamping-nuts, which when loosened will permit the blocks and brush mounted therein to be adjusted. This brush is for the purpose of cleaning the teeth of the combs on the drum and is adapted to be driven in a direction opposite to the rotation of said drum by means of a small pulley 35, fixed on the outer end of the shaft, said pulley being connected by a cross-belt 37 with a large drive-pulley 36, fixed on the end of the main drive-shaft.

On the lower forward side of the machine is arranged a pair of rubber delivery-rolls 38, which are similar in construction to and are driven at the same rate of speed as the feed-rolls. The shafts or journals of the delivery-rolls are mounted in bearing-brackets 39, secured to the forward side of the standards. On the end of the shaft or journal of one of said rolls is fixed a pulley 40, which is connected by a belt 41 with a pulley 42, fixed on the end of the feed-roll shaft on which the ratchet-wheel 25 is mounted, so that the motion of the feed-rolls is imparted to the delivery-rolls to cause the same to deliver the cleaned fiber at the same rate of speed that the leaves or stalks are fed into the machine by the feed-rolls.

On the end of the main drive-shaft opposite to that on which the pulley 36 is fixed are mounted loose and fixed drive-pulleys 42 and 43, with which may be connected a belt to drive said shaft.

To separate and clean the fibers from leaves or stalks, the ends of the same are inserted between the feed-rolls, which will feed said end into the central slot 10, where it is engaged by the combs on the drum, which coact with the inner side of the curved wall of the concave to comb and clean the fiber as the same is fed into the machine. The drum 6 and the brush 33 rotate in the directions indicated by the arrows in Fig. 4, the combs 7 carrying the fibers downward. The first ends of the fibers treated may be led by hand between the discharge-rolls 38, and after the fibers have been thus started they will continue to feed between said rolls during the operation of the machine. The brush 32 entering the lower slot 11 holds said fiber out in position to be engaged by the teeth of the combs.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

1. In a fiber-cleaning machine, the combination of a revoluble drum having peripheral combs, a concave on one side of the drum and having openings 9, 10 and 11, feed-rollers arranged opposite the opening 10 and a brush extending through the opening 11, substantially as described.

2. In a fiber-cleaning machine, the combination with a supporting-frame of a drive-shaft mounted thereon, a wheel or drum fixed on said shaft, combs secured to said drum, a concave arranged on said frame to coact with said combs, feed-rolls arranged on said frame adjacent to said concave, one of said rolls being journaled in slidably-mounted boxes, springs arranged beneath said boxes to normally hold said movable roll in engagement with said stationary roll, means for adjusting the tension of said springs, and means for holding said movable roll out of engagement with said stationary roll, against the tension of said springs, substantially as described.

3. In a fiber-cleaning machine, the combination with a supporting-frame of a drive-shaft mounted thereon, a wheel or drum fixed on said shaft, combs secured to said drum, a concave arranged on said frame to coact with said combs, a pair of feed-rolls mounted on said frame, a ratchet-wheel fixed on one of said shafts, a lever loosely mounted on the end of said shaft, a pawl carried by the upper end of said lever to engage the teeth of said ratchet-wheel, a pitman-rod adjustably connected at one end to the lower end of said lever, and connected at its opposite end to an eccentric fixed on the drive-shaft of the machine, whereby an intermittent movement is given to said rolls, substantially as described.

4. In a fiber-cleaning machine, the combination with a supporting-frame of a drive-shaft mounted thereon, a wheel or drum fixed on said shaft, combs secured to said drum, a concave arranged on said frame to coact with said combs, a pair of feed-rolls mounted on said frame, a ratchet-wheel fixed on one of said shafts, a lever loosely mounted on the end of said shaft, a pawl carried by the upper end of said lever to engage the teeth of said ratchet-wheel, a pitman-rod adjustably connected at one end to the lower end of said lever, and connected at its opposite end to an eccentric fixed on the drive-shaft of the machine, whereby an intermittent movement is given to said rolls, a pair of delivery-rolls mounted on said frame, a pulley fixed on the shaft of one of said rolls, a belt connecting said pulley with a similar pulley fixed on the end of said feed-roll shaft, whereby the movement of said feed-rolls will be communicated to said delivery-rolls, substantially as described.

In testimony whereof we have hereunto set our hands in presence of two subscribing witnesses.

JOHN H. McCAULEY.
    EDGAR M. WINFREY.

Witnesses:
 P. P. LANGFORD,
 C. W. HENDRICKS.